United States Patent
Michalewicz (10) Patent No.: US 7,302,050 B1
(45) Date of Patent: *Nov. 27, 2007

(54) METHOD AND SYSTEM FOR INDEPENDENT PARTICIPANT CONTROL OF AUDIO DURING MULTIPARTY COMMUNICATION SESSIONS

(75) Inventor: Larry G. Michalewicz, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 365 days.

This patent is subject to a terminal disclaimer.

(21) Appl. No.: 10/936,977

(22) Filed: Sep. 9, 2004

Related U.S. Application Data (63) Continuation of application No. 09/742,020, filed on Dec. 20, 2000, now Pat. No. 6,792,092.

(51) Int. Cl.
*H04M 3/42* (2006.01)

(52) U.S. Cl. .............. 379/202.01; 370/261; 709/204; 715/753; 348/14.08; 348/14.09

(58) Field of Classification Search .......... 379/202.01; 370/261; 709/204; 715/753; 348/14.08, 348/14.09

See application file for complete search history.

(56) References Cited

U.S. PATENT DOCUMENTS

| | | | |
|---|---|---|---|
| 4,359,603 A | 11/1982 | Heaton | 179/1 CN |
| 4,730,306 A | 3/1988 | Uchida | 370/62 |
| 5,034,947 A | 7/1991 | Epps | 370/268 |
| 5,260,938 A | 11/1993 | Hofmann | 370/269 |
| 5,436,896 A | 7/1995 | Anderson et al. | 370/260 |
| 5,539,741 A | 7/1996 | Barraclough et al. | 370/62 |
| 6,178,237 B1 | 1/2001 | Horn | 379/202.01 |
| 6,327,567 B1 | 12/2001 | Willehadson et al. | 704/270 |
| 6,453,022 B1 | 9/2002 | Weinman, Jr. | 379/88.13 |
| 6,501,739 B1 | 12/2002 | Cohen | 370/260 |

*Primary Examiner*—Quynh H. Nguyen
(74) *Attorney, Agent, or Firm*—Baker Botts L.L.P.

(57) ABSTRACT

A method and system for independent participant control of audio during a multiparty communication session includes receiving an audio stream from each of a plurality of participants to a multiparty communication connection. An audio control signal is received from a participant for an audio stream of another participant. A conference output stream is generated for the participant by applying an audio parameter based on the audio control signal to the audio stream.

59 Claims, 4 Drawing Sheets

| PARTICIPANT | PARTICIPANT 1 OUTPUT AUDIO | PARTICIPANT 2 OUTPUT AUDIO | PARTICIPANT 3 OUTPUT AUDIO | ... |
|---|---|---|---|---|
| 1 | N/A | 1.2 | 1.4 | ... |
| 2 | 1 | N/A | 0.6 | ... |
| 3 | 0.8 | 1 | N/A | ... |
| ⋮ | ⋮ | ⋮ | ⋮ | ... |

METHOD AND SYSTEM FOR INDEPENDENT PARTICIPANT CONTROL OF AUDIO DURING MULTIPARTY COMMUNICATION SESSIONS

CROSS-REFERENCE TO RELATED APPLICATION

This application is a continuation of U.S. Ser. No. 09/742,020 filed Dec. 20, 2000 now U.S. Pat. No. 6,792,092 and entitled "Method and System for Independent Participant Control of Audio During Multiparty Communication Sessions".

TECHNICAL FIELD OF THE INVENTION

The present invention relates generally to the field of multiparty communications, and more particularly to a method and system for independent participant control of audio during multiparty communication sessions.

BACKGROUND OF THE INVENTION

Modern business practices often require that several persons meet on the telephone to engage in a conference call. The conference call has introduced certain applications and techniques that are superior to those found in a meeting with persons physically present in the same location. For example, a conference call attendee who is not participating at the moment may wish to mute their audio output and simply listen to the other conferencee. This allows the particular conferee to work on another project while still participating in the conference.

While the conference call has been substantially helpful in minimizing travel expenses and other costs associated with business over long distances, significant obstacles still remain in accomplishing the same tasks with the same efficiency as one would in having a meeting with all persons in the same physical location. For example, the audio received by a particular conferencee may be inadequately balanced between the other conferencees such that one conferencee mutes or makes more difficult to hear the comments and participation of the other conferencees or to distinguish between other conferencees.

SUMMARY OF THE INVENTION

The present invention provides a method and a system for independent participant control of audio during multiparty communication sessions that substantially eliminate or reduce the disadvantages and problems associated with previous systems and methods. In particular, independent and discrete control of audio signal strength are provided to participants of a conference call or other suitable multiparty connection.

In accordance with one embodiment of the present invention, a method and system for independent participant control of audio during a multiparty communication session includes receiving an audio stream from each of a plurality of participants to a multiparty communication connection. An audio control signal is received from a participant for an audio stream of another participant. A conference output stream is generated for the participant by applying an audio parameter based on the audio control signal to the audio stream of the other participant.

More specifically, in accordance with a particular embodiment of the present invention, the audio parameter comprises an audio volume parameter and a conference output stream for the participant comprises a volume for the audio stream adjusted based on the audio volume parameter. The audio control signals may comprise the audio parameter on an adjustment to the audio parameter.

Technical advantages of the present invention include providing a method and system for independent participant control of audio during multiparty communication sessions. In one or more embodiments, an audio volume feature allows a participant of a conference call to independently and discretely adjust the relative volume of each other participant within his or her conference stream. Accordingly, participants on a conference call or other multiparty session may each customize characteristics of the call without affecting other participants.

Another technical advantage of one or more embodiments of the present invention include providing an improved conference bridge. In particular, the conference bridge independently and dynamically adjusts for each participant the audio volume or signal strength of the other participants. Accordingly, the conference bridge allows participants to each customize call characteristics to suit their particular needs and to more efficiently conduct business during the call.

Other technical advantages of the present invention will be readily apparent to one skilled in the art from the following figures, description and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which.

DETAILED DESCRIPTION OF THE INVENTION

Figure 1:
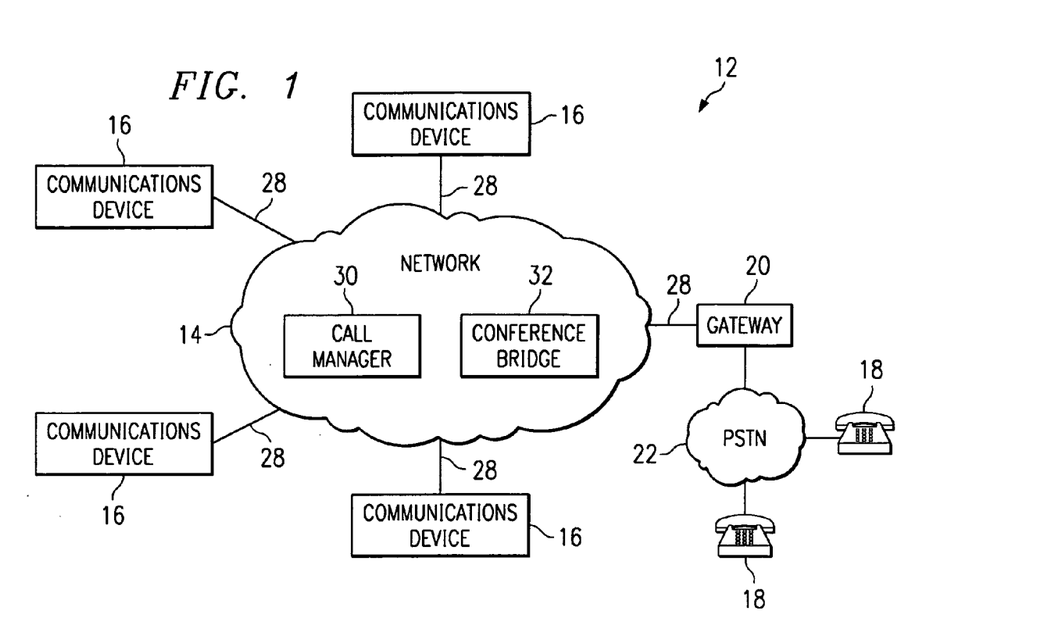
FIG. 1 is a block diagram illustrating a communications system in accordance with one embodiment of the present invention.

FIG. 1 illustrates a communications system 12 in accordance with one embodiment of the present invention. In this embodiment, the communications system 12 is a distributed system transmitting audio, video, voice, data and other suitable types of real-time and non real-time traffic between source and destination endpoints.

Referring to FIG. 1, the communications system 12 includes a network 14 connecting a plurality of communication devices 16 to each other and to standard analog telephones 18 through a gateway 20 and the public switched telephone network (PSTN) 22. The communication devices 16, standard analog telephones 18 and gateway 20 are connected to the network 14 and/or PSTN 22 through twisted pair, cable, fiber optic, radio frequency, infrared, microwave and/or any other suitable wireline or wireless links 28.

In one embodiment, the network 14 is the Internet, a wide area network (WAN), a local area network (LAN) or other suitable packet-switched network. In the Internet embodiment, the network 14 transmits information in Internet Protocol (IP) packets. Telephony voice information is transmitted in the Voice over IP (VoIP) format. Real-time IP packets such as VoIP packets are encapsulated in real-time transport protocol (RTP) packets for transmission over the network 14. It will be understood that the network 14 may comprise any other suitable types of elements and links and that traffic may be otherwise suitably transmitted using other protocols and formats.

The communication devices 16 also communicate control information with the network 14 to control call setup, teardown and processing as well as call services. The communication devices 16 comprise IP or other digital telephones, personal and other suitable computers or computing devices, personal digital assistants (PDAs), cell or other mobile telephones or any other device or set of devices such as the telephone 18 and gateway 20 combination capable of communicating real-time audio, video and/or other information over the network 14.

For voice calls, the communication devices 16 comprise real-time applications that play traffic as it is received or substantially as it is received into which packet delivery cannot be interrupted without severely degrading performance. A codec (coder/decoder) converts audio, video or other suitable signals generated by users from analog signals into digital form. The digital encoded data is encapsulated into IP or other suitable packets for transmission over the network 14. IP packets received from the network 14 are converted back into analog signals and played to the user. It will be understood that the communication devices may otherwise suitably encode and decode signals transmitted over or received from the network 14.

The gateway 20 provides conversion between analog and/or digital formats. The standard analog telephones 18 communicate standard telephony signals through PSTN 22 to the gateway 20. At the gateway 20, the signals are converted to IP packets in the VoIP format. Similarly, VoIP packets received from the network 14 are converted into standard telephony signals for delivery to the destination telephone 18 through PSTN 22. The gateway 20 also translates between analog the network call control system and the Signaling System 7 (SS7) protocol and other signaling protocols used in PSTN 22.

In one embodiment, the network 14 includes a call manager 30 and a conference bridge 32. The call manager 30 and the conference bridge 32 may be located in a central facility or have their functionality distributed across and/or at the periphery of the network 14. The call manager 30 and the conference bridge 32 are connected to the network 14 by any suitable type of wireline or wireless link. In another embodiment, the network 14 may be operated without the call manager 30, in which case the communication devices 16 may communicate control information directly with each other or with other suitable network elements. In this embodiment, services are provided by the communication devices 16 and/or other suitable network elements.

The call manager 30 manages calls in the network 14. A call is any communication session between two or more parties. The parties may be persons and/or equipment such as computers. The sessions may include real-time connections, connections having real-time characteristics, non real-time connections and/or a combination of connection types.

The call manager 30 is responsive to service requests from the communication devices 16, including the standard telephones 18 through the gateway 20. For example, the call manager 30 may provide voicemail, bridging, multicasting, call hold, conference call and other multiparty communications and/or other suitable services for the communications devices 16. The call manager 30 provides services by performing the services, controlling performance of the services, delegating performance of the services and/or by otherwise initiating the services.

The conference bridge 32 provides conference call and other suitable audio, video, and/or real-time multiparty communication sessions between communication devices 16. In particular, the conference bridge 32 receives media from participating devices 16 and, using suitable signal processing techniques, mixes the media to produce conference signals. During normal operation, each device 16 receives a conference signal that includes contributions from all other participating devices.

As described in more detail below, the conference bridge 32 provides for independent participant control of audio during multiparty communications sessions. The audio may be voice data from a conference call or other suitable transmission including an audio component. The multiparty communication session includes three or more parties exchanging audio and/or other suitable information.

In a particular embodiment, the conference bridge 32 provides a volume feature that allows each participant to independently and discretely adjust within his or her conference output stream the relative audio volume, or signal strength, of each other participant. Thus, participants on a conference call or other multiparty communications session may each customize parameter for the call to suit their needs without affecting other participants.

To support independent participant control of audio, the call manager 30 may receive audio control signals from the individual participants and pass the signals onto the conference bridge 32 for customization of each participant's conference output stream. In another embodiment, the communication devices 16 may directly communicate the audio control signals to the conference bridge 32 for customization of the conference output streams. The audio control signals may comprise audio parameters for customizing the conference output streams or adjustments to pre-existing audio parameters for customizing the conference output streams. The audio control signals may comprise a call signaling message and be generated by the communication devices 16, telephones 18 and/or gateway 20 by or in response to a hard key, a soft key, a feature button or a sequence of keypad presses.

In operation, a call initiation request is first sent to the call manager 30 when a call is placed over the network 14. The call initiation request may be generated by a communication device 16 and/or the gateway 20 for telephones 18. Once the call manager 30 receives the call initiation request, the call manager 30 sends a signal to the initiating communication device 16 and/or gateway 20 for telephones 18 offering to call the destination device. If the destination device can accept the call, the destination device replies to the call manager 30 that it will accept the call. By receiving this acceptance, the call manager 30 transmits a signal to the destination device causing it to ring. When the call is answered, the call manager 30 instructs the called device and the originating device to begin media streaming to each other. If the originating device is a PSTN telephone 18, the media streaming occurs between the gateway 20 and the destination device. The gateway 20 then transmits the media to telephone 18.

For conference calls, the call manager 30 identifies participants based on the called number or other suitable criteria. The call manager 30 controls the conference bridge 32 to set up, process and tear down conference calls and other multiparty communication sessions. During the multiparty communications sessions, participants are connected and stream media through the conference bridge 32. The media is cross connected and mixed to produce conference output streams for each participant. The conference output stream for a participant includes the media of all other participants, a subset of other participants or other suitable mix dictated by the type of multiparty session and/or the participant.

Figure 2:
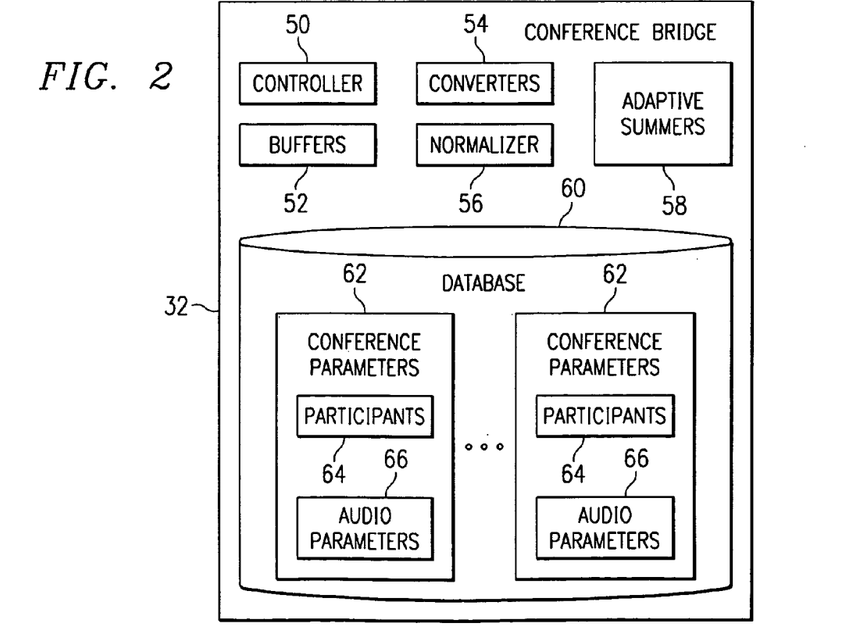
FIG. 2 is a block diagram illustrating details of the conference bridge of FIG. 1 in accordance with one embodiment of the present invention.

FIG. 2 illustrates details of the conference bridge 32 in accordance with one embodiment of the present invention. In this embodiment, the conference bridge 32 provides real-time multiparty audio connections between three or more participants. It will be understood that the conference bridge 32 may support other types of suitable multiparty communications sessions including real-time audio streams without departing from the scope of the present invention.

Referring to FIG. 2, conference bridge 32 concludes controller 50, buffers 52, converters 54, normalizer 56, adaptive summers 58 and database 60. The controller 50, buffers 52, converters 54, normalize 56, adaptive summers 58 and database 60 may comprise logic encoded in media. Logic comprises functional instructions for carrying out programmed tasks. The media comprises computer disks or other suitable computer-readable media, applications specific integrated circuits (ASIC), field programmable gate arrays (FPGA), digital signal processor (DSP) or other suitable specific or general purpose processors, transmission media or other suitable media in which logic may be encoded and utilized.

The controller 50 directs the other components of the conference bridge 32 and communicates with the call manager 30 to set up, process and tear down conference calls. The controller 50 also receives audio control signals from participants either directly from the communication devices 16 or through the call manager 30. The audio control signals include audio parameters and/or adjustments to stored audio parameters for the conference output streams of each participant. As used herein, the term each means everyone of at least a subset of identified items. The audio parameters or adjustments to audio parameters are stored in the database 60.

The buffers 52 include input and output buffers. The input buffers receive and buffer packets of input audio streams from participants for processing by the conference bridge 32. The output buffers receive and buffer conference output streams generated by the conference bridge 32 for transmissions to participants. In a particular embodiment, a particular input buffer or set of input buffer resources are assigned to each audio input stream and a particular output buffer or set of output buffer resources are assigned to each conference output stream. The input and output buffers may be associated with corresponding input and output interfaces and perform error check, packet loss prevention, packet ordering and congestion control functions.

The converters 54 include input and output converters. The input converters receive input packets of a participant from a corresponding buffer and convert the packet from the native format of the participant's device 16 to a standard format of the conference bridge 32 for cross linking and processing in the conference bridge 32. Similarly, the output converters receive conference output streams for participants in the standard format and convert the conference output streams to the native format of participant's devices. In this way, the conference bridge 32 allows participants to connect using a variety of devices and technologies.

The normalizers 56 include input and/or output normalizers. The normalizers received packets from the input audio streams in a common format and normalize the timing of the packets for cross connections in the adaptive summers 58.

The adaptive summers 58 include a plurality of summers or other suitable signal processing resources each operable to sum, add or otherwise combine a plurality of input streams based on dynamic parameters into conference output streams for participants to a conference call. Once the adaptive summers 58 have generated the conference output streams, each conference output stream is converted by a corresponding converter and buffered by a corresponding output buffer for transmission to the corresponding participant.

In one embodiment, each participant is assigned an adaptive summer that receives audio input streams from each other participant to the conference call and audio parameters for the input streams. The adaptive summer combines the audio input streams based on the audio parameters to generate a customized conference output stream for delivery to the participant. The adaptive summers may each store relevant audio parameters or may access the database 60 to obtain the audio parameters. The audio parameters may be dynamically and independently changed by each participant during a conference call to allow dynamic and ongoing modifications to the conference output stream for the participant.

In a particular embodiment, the adaptive summers 58 store a participant parameter for each input audio stream and multiplies each input audio stream by the corresponding audio parameter. In this way, the adaptive summers 58 can individually and discretely amplify or attenuate the strength of any signal within the conference output stream for a participant. For example, in generating a conference output stream for participant "A", an adaptive summer 58 may amplify the signal strength of participant "B" by multiplying it by a factor of 1.1, attenuate the signal strength of participant "C" by a factor of 0.9 and maintain the signal strength of participant "D".

This may be illustrated by the following formula:

$$A=1.1*B+0.9*C+1.0D$$

where A is the conference output stream for participant "A"; B is the input audio stream from participant "B", C is the input audio stream from participant "C" and D is the input audio stream from participant "D".

The database 60 includes a set of conference parameters 62 for each ongoing conference call of the conference bridge 32. The conference parameters 62 for each conference call include an identification of participants 64 and individualized audio parameters 66 for each participant. In one embodiment, the participants are identified at the beginning of a conference call based on caller ID, phone number or other suitable identifier. The audio parameters may be initially set to a default value with adjustments to the parameters and/or new parameters received from the participants in-band with the audio stream or over a control link or channel. Each adjustment to an audio parameter and/or new audio parameter should directly or indirectly identify the participant setting that parameter and the input audio stream to which it applies. Upon modification of an audio parameter, the new parameter is written to the corresponding adaptive summer 58 for application.

Figure 3:
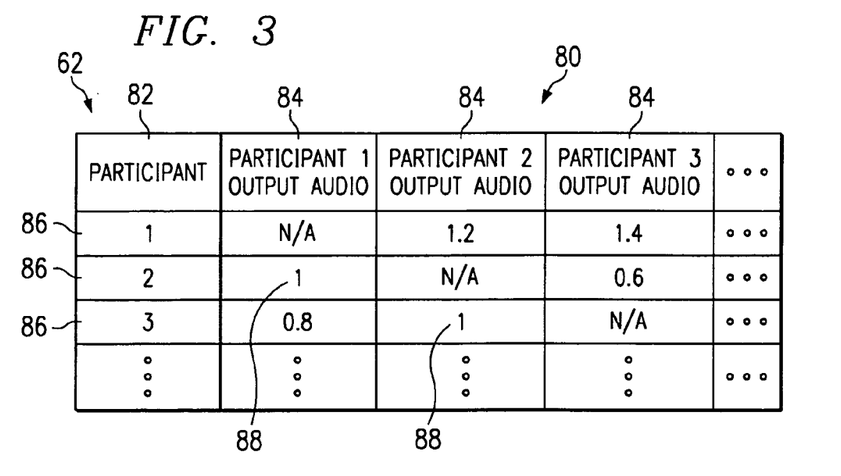
FIG. 3 is a table diagram illustrating details of the conference parameters of FIG. 2 in accordance with one embodiment of the present invention.

FIG. 3 illustrates a data structure for conference parameters 62 in accordance with one embodiment of the present invention. In this embodiment, the conference parameters 62 are stored in a database table for each ongoing conference call. It will be understood that the conference parameters 62 may be otherwise suitably stored without departing from the scope of the present invention.

Referring to FIG. 3, a conference parameter table 80 includes a participant column 82 uniquely identifying the participants to a conference call and audio parameter columns 84 each storing audio parameters to be applied to the input audio stream of the corresponding participant. These parameters are selected by other participants for their conference output streams. Each participant row 86 indicates the audio parameters 88 selected by the corresponding participant for each other participant's audio input stream. The audio parameter of each participant's input stream in its own output stream may be empty if the adaptive summer 58 for the participant is not provided with that participant's own input stream or may be zero to eliminate the participant's own input stream from its own conference output stream.

In exemplary table 80, participant "1" has an audio parameter of 1.2 for participant "2" and 1.4 for participant "3." Thus, the signal for the audio stream of participant "3" will be relatively higher, or louder, than that of participant "2" in the conference output stream provided to participant "1." Participant "2" has an audio parameter of 1.0 for the audio stream of participant "1" and an audio parameter of 0.6 for the audio stream of participant "3." An audio parameter of 1.0 may be a default and/or neutral parameter neither amplifying nor attenuating the corresponding signal. Thus, participant "1" will have a relatively higher volume than participant "3" in the conference output stream for participant "2". Similarly, participant "3" has an audio parameter of 0.8 for participant "1" and 1.0 for participant "2." Thus, participant "2" will have a relatively higher volume than participant "1" in the conference output stream for participant "3." It will be understood that the audio parameter may indicate other suitable types of treatment for distinguishing between the input streams in the conference output stream.

Figure 4:
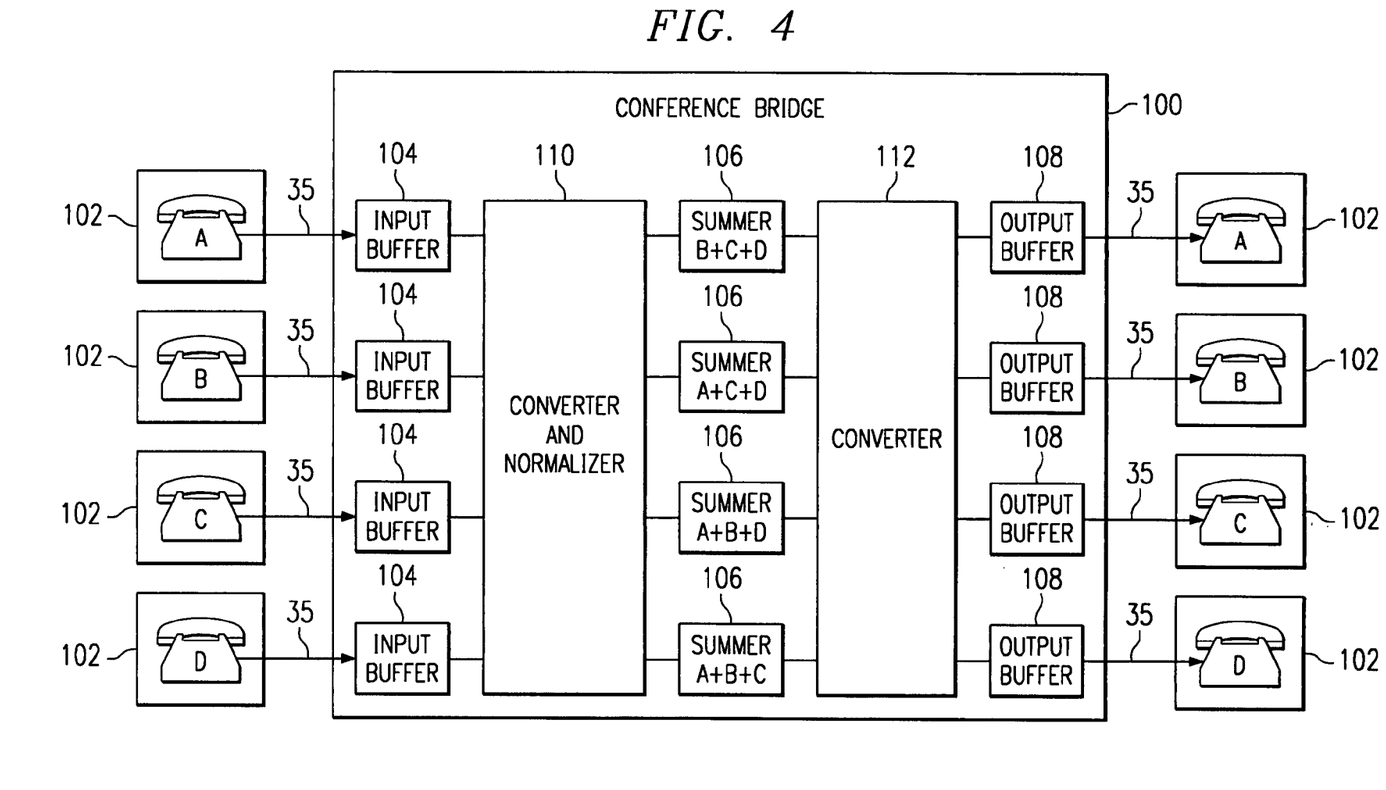
FIG. 4 is a block diagram illustrating the conference bridge of FIG. 2 configured for an exemplary conference call in accordance with one embodiment of the present invention.

FIG. 4 illustrates a conference bridge 100 managing an exemplary conference call between users A, B, C and D. In the illustrated embodiment, the conference bridge 100 is configured to provide each participant 102 an input buffer 104, adaptive summer 106 and output buffer 108. Each input buffer 104 receives and buffers an audio stream from a corresponding participant 102 and passes the packets to the converter and normalizer 110. The converter and normalizer 110 convert the packets from their native format to a common format for the conference bridge 100 and/or conference call and normalize the packets. The packets are then cross connected to the adaptive summers 106.

Each adaptive summer 106 is associated with a participant 102 and receives input audio streams from each other participant 102. Thus, adaptive summer 106 for participant A, for example, includes audio input streams for participants B, C and D. Similarly, adaptive summer 106 for participant B receives audio streams from participants A, C and D, while adaptive summer 106 for participant C receives audio streams from participants A, B and D and adaptive summer 106 for participant D receives audio streams from participants A, B and C.

In the adaptive summers 106, each audio stream is, before being combined with other streams, multiplied by a corresponding audio parameter set by the participant to which the conference output stream is provided. The audio streams are multiplied by a value of that is greater than 1 to amplify the signal, a value of 1 to leave the signal unchanged and by a value that is less than 1 to attenuate the signal. In addition, each audio signal may be multiplied by a value of 0 or substantially 0 to remove or substantially remove the signal from the conference output stream.

The conference output streams with the adjusted input signals are each passed to the converter 112 for conversion back to the native format of the corresponding participant. Packets of the conference output stream are buffered at output buffer 108 for transmission to the corresponding participant 102.

Figure 5:
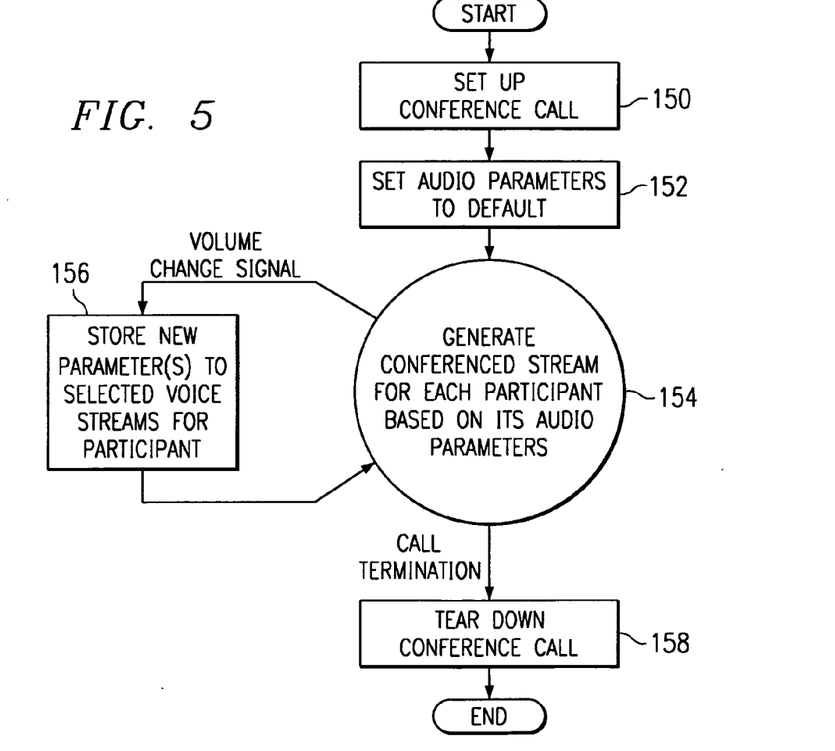
FIG. 5 is a flow diagram illustrating a method for independent participant control of audio during a conference call in accordance with one embodiment of the present invention.

FIG. 5 illustrates a method for independent participant control of audio during a conference call in accordance with one embodiment of the present invention. The method begins at step 150 in which a conference call is initially set up by the call manager 30 in the conference bridge 32.

Proceeding to step 152, audio parameters are set to default for each participant to the conference call. In one embodiment, the default parameters include a value of 1.0 such that each input stream has the same relative weight of each other input stream. It will be understood that other suitable default parameters may be used or that audio parameter may be initially received from each participant for the conference call. Step 152 leads to state 154.

At state 154, a conference output stream is generated for each participant based on audio parameters set by and/or for the participant. In a particular embodiment, the audio input streams of each other participant is multiplied by the audio parameters set by a participant and then combined into a conference output stream for the participant.

In response to receipt of a new audio volume parameter, adjustment of an existing volume parameter or other suitable volume change, state 154 transitions to step 156. At step 156, the new audio volume parameter is stored or the existing audio parameter adjusted based on control signal received from the participant. The signal may be received in-band with the packets or may be an out-of-band control signal. Thus, the participant may adjust the volume of one member of the conference without increasing the volume of the other members. Step 156 returns to state 154 in which the conference output stream is generated using the new parameter.

In response to call termination, state 154 transitions to step 158. At state 158, the conference call is torn down. Upon teardown of the conference call, the conference parameter 62 may be deleted from the database 60. Alternatively, parameters for certain participants may be stored and reused in later conference calls.

Figure 6:
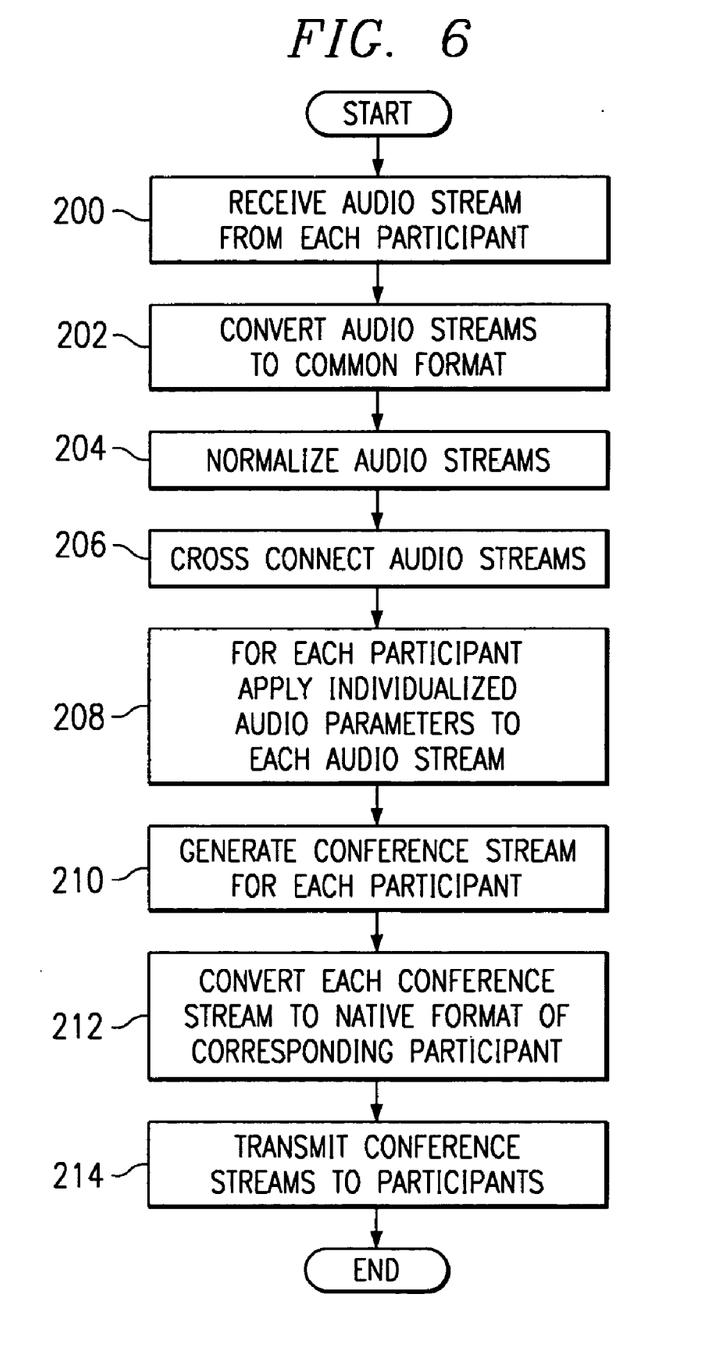
FIG. 6 is a flow diagram illustrating a method for providing conference streams to participants on a conference call based on individualized parameters of the participants in accordance with one embodiment of the present invention.

FIG. 6 illustrates a method for providing conference streams to participants on a conference call based on individualized participant parameters in accordance with one embodiment of the present invention. The method begins at step 200 in which an audio stream is received from each participant and buffered.

Proceeding to step 202, the audio streams are each converted to a common format for the conference bridge 32. Next, at step 204, the audio streams are normalized. At step 206, the normalized audio streams are cross connected to the adaptive summers 58 or other suitable device capable of combining the streams to generate conference output streams.

At step 208, individualized audio parameters are applied to each audio stream for each participant. At step 210, the adjusted audio streams are combined to generate conference output streams for each participant. In this way, each participant is able to individually and discretely control the participation of each other participant in his or her conference stream.

Next, at step 212, each conference output stream is converted to the native format of the corresponding participant. At step 214, the conference streams are buffered and transmitted to the participants. Step 214 leads to the end of the process by which the conference bridge customizes the conference call for each participant based on inputs from that participant.

Although the present invention has been described with several embodiments, various changes and modifications may be suggested to one skilled in the art. It is intended that the present invention encompass such changes and modifications as fall within the scope of the appended claims.

What is claimed is:

1. A method for independent participant control of audio during a multiparty communication session, comprising:
   receiving an audio stream from each of a plurality of participants to a multiparty communication connection, wherein each audio stream comprises a plurality of packets;
   receiving an audio control signal from a first participant for an audio stream of a second participant;
   normalizing a timing of the packets of each of the audio streams;
   applying an audio parameter based on the audio control signal to packets within the audio stream received from the second participant; and
   generating a conference output stream for the first participant that includes the packets to which the audio parameter was applied.

2. The method of claim 1, wherein applying the audio parameter based on the audio control signal to the packets comprises applying the audio control signal to the packets.

3. The method of claim 1, wherein applying the audio parameter based on the audio control signal to the packets comprises adjusting the audio parameter by an amount determined based on the audio control signal.

4. The method of claim 1, further comprising receiving the audio control signal from the first participant for audio streams received from the second participant; and wherein generating the conference output stream for the first participant comprises generating the conference output stream by applying the audio parameter based on the audio control signal to only packets within the audio stream received from the second participant.

5. The method of claim 1, further comprising:
   receiving the audio control signal from the first participant for a plurality of audio streams; and
   generating the conference output stream for the first participant by applying the audio parameter based on the audio control signal to packets within the plurality of audio streams.

6. The method of claim 1, further comprising:
   receiving the audio control signal from the first participant for a subset of the audio streams; and
   generating the conference output stream for the first participant by applying the audio parameter based on the audio control signal to packets within the subset of audio streams.

7. The method of claim 1, wherein the audio parameter comprises an audio volume parameter and applying the audio parameter comprise adjusting a volume associated with the audio stream based on the audio control signal.

8. The method of claim 1, further comprising:
   receiving independent audio control signals from each of a plurality of participants for controlling particular audio streams received by that participant; and
   generating conference output streams for each participant by applying audio parameters based on the audio control signal received from that participant to packets within the audio streams for that participant.

9. The method of claim 1, further comprising generating the conference output stream for the first participant by multiplying the audio parameter by values associated with packets within the audio stream prior to combining the audio stream with other audio streams of the conference output stream for the first participant.

10. The method of claim 1, wherein the multiparty communication connection comprises a conference call.

11. The method of claim 1, wherein each audio stream comprises a plurality of packets communicated according to Internet Protocol (IP).

12. The method of claim 1 further comprising converting packets within each audio stream received from the second participant from a native format to a common format.

13. The method of claim 1, further comprising converting packets within each conference output stream for the first participant from a common format to a native format.

14. A computer program stored on a tangible computer readable medium, the computer program operable to:
   receive an audio stream from each of a plurality of participants to a multiparty communication connection, wherein each audio stream comprises a plurality of packets; receive an audio control signal from a first participant for an audio stream of a second participant;
   normalize a timing of the packets of each of the audio streams;
   apply an audio parameter based on the audio control signal to packets within the audio stream received from the second participant; and
   generate a conference output stream for the first participant that includes the packets to which the audio parameter was applied.

15. The computer program of claim 14, wherein the computer program is further operable to apply the audio parameter based on the audio control signal to the packets by applying the audio control signal to the packets.

16. The computer program of claim 14, wherein the computer program is further operable to apply the audio parameter based on the audio control signal to the packets by adjusting the audio parameter by an amount determined based on the audio control signal.

17. The computer program of claim 14, wherein the computer program is further operable to receive the audio control signal from the first participant for audio streams received from the second participant; and wherein generating the conference output stream for the first participant comprises generating the conference output stream by applying the audio parameter based on the audio control signal to only packets within the audio stream received from the second participant.

18. The computer program of claim 14, wherein the computer program is further operable to:
receive the audio control signal from the first participant for a plurality of audio streams; and
generate the conference output stream for the first participant by applying the audio parameter based on the audio control signal to packets within the plurality of audio streams.

19. The computer program of claim 14, wherein the computer program is further operable to:
receive the audio control signal from the first participant for a subset of the audio streams; and
generate the conference output stream for the first participant by applying the audio parameter based on the audio control signal to packets within the subset of audio streams.

20. The computer program of claim 14, wherein the audio parameter comprises an audio volume parameter, and wherein the computer program is further operable to apply the audio parameter by adjusting a volume associated with the audio stream based on the audio control signal.

21. The computer program of claim 14, wherein the computer program is further operable to:
receive independent audio control signals from each of a plurality of participants for controlling particular audio streams received by that participant; and
generate conference output streams for each participant by applying audio parameters based on the audio control signal received from that participant to packets within the audio streams for that participant.

22. The computer program of claim 14, wherein the computer program is further operable to generate the conference output stream for the first participant by, prior to combining the audio stream received from the second participant with other audio streams, multiplying the audio parameter by values associated with packets within the audio stream.

23. The computer program of claim 14, wherein the multiparty communication connection comprises a conference call.

24. The computer program of claim 14, wherein each audio stream comprises a plurality of packets communicated according to Internet Protocol (IP).

25. The computer program of claim 14, wherein the computer program is further operable to convert packets within each audio stream received from the second participant from a native format to a common format.

26. The computer program of claim 14, wherein the computer program is further operable to convert packets within each conference output stream for the first participant from a common format to a native format.

27. A device for participant control of audio during a communication session, comprising:
an input buffer operable to receive an audio stream from each of a plurality of participants to a multiparty communication connection, wherein each audio stream comprises a plurality of packets;
a normalizer operable to normalize a timing of the packets of each of the audio streams;
a conference stream output generator operable to:
receive an audio control signal from a first participant for an audio stream of a second participant;
apply an audio parameter based on the audio control signal to packets within the audio stream received from the second participant; and
generate a conference output stream for the first participant that includes the packets to which the audio parameter was applied.

28. The device of claim 27, wherein the conference stream output generator is further operable to apply the audio parameter based on the audio control signal to the packets by applying the audio control signal to the packets.

29. The device of claim 27, wherein the conference stream output generator is further operable to apply the audio parameter based on the audio control signal to the packets by adjusting the audio parameter by an amount determined based on the audio control signal.

30. The device of claim 27, wherein the conference stream output generator is further operable to receive the audio control signal from the first participant for audio streams received from the second participant and to generate the conference output stream for the first participant by generating the conference output stream by applying the audio parameter based on the audio control signal to only packets within the audio stream received from the second participant.

31. The device of claim 27, wherein the conference stream output generator is further operable to:
receive an audio control signal from the first participant for each of a plurality of audio streams; and
generate the conference output stream for the first participant by applying the audio parameter, based on the audio control signal for that audio stream, to packets within the each audio stream.

32. The device of claim 27, wherein the conference stream output generator is further operable to:
receive the audio control signal from the first participant for a subset of the audio streams; and
generate the conference output stream for the first participant by applying the audio parameter based on the audio control signal to packets within each of the subset of audio streams.

33. The device of claim 27, wherein the audio parameter comprises an audio volume parameter and wherein the conference stream output generator is further operable to apply the audio parameter to the by adjusting an audio volume parameter associated with the packets based on the audio control signal.

34. The device of claim 27, wherein the conference stream output generator is further operable to:
receive independent audio control signals from each of a plurality of participants for controlling particular audio streams received by that participant; and
generate conference output streams for each participant by applying audio parameters based on the audio control signal received from that participant to packets within the audio streams for that participant.

35. The device of claim 27, wherein the conference stream output generator is further operable to generate the conference output stream for the first participant by multiplying, prior to combining the audio stream with other audio streams of the conference output stream, the audio parameter by values associated with packets within the audio stream.

36. The device of claim 27, wherein the multiparty communication connection comprises a conference call.

37. The device of claim 27, wherein each audio stream comprises a plurality of packets communicated according to Internet Protocol (IP).

38. The device of claim 27, wherein the conference stream output generator is further operable to convert packets within each audio stream received from the second participant from a native format to a common format.

39. The device of claim 27, wherein the conference stream output generator is further operable to convert packets within each conference output stream for the first participant from a common format to a native format.

40. A method for independent participant control of audio properties for a multiparty communication connection, comprising:
  receiving an audio stream from each of a plurality of participants to a multiparty communication connection, wherein the audio stream comprises a plurality of packets;
  normalizing a timing of the packets from each of the plurality of participants;
  cross-connecting the audio stream of each participant to a conference output stream generator for each of the remaining participants;
  applying an audio parameter, at the conference stream output generator of each participant, to packets of each audio stream received for that participant, wherein the audio parameter is set by the participant for that particular audio stream; and
  combining, after application of the audio parameters at the conference stream output generator, a set of resulting audio streams to generate a conference output stream for that participant.

41. The method of claim 40, wherein the audio parameters comprise a multiple and are applied to the audio streams by multiplying the multiple by the values associated with packets within the audio stream.

42. The method of claim 40, further comprising converting packets within each audio stream received from a participant from a native format to a common format.

43. The method of claim 40, further comprising converting packets within each conference output stream for a participant from a common format to a native format.

44. The method of claim 40, further comprising dynamically changing the audio parameters based on participant input.

45. The method of claim 40, wherein the audio stream comprises a plurality of packets communicated according to Internet Protocol (IP).

46. A conference bridge, comprising:
  an input buffer for each of a plurality of participants, the input buffer operable to receive and buffer audio streams generated by the participants, wherein each audio stream comprises a plurality of packets;
  a normalizer operable to normalize a timing of the packets received from each of the participants;
  a cross-connect operable to cross-connect an audio stream from each participant to conference output stream generators for remaining participants;
  the conference stream output generator for each participant operable to apply an audio parameter to packets of each audio stream received for that participant, wherein the audio parameter is set by the participant for that particular audio stream; and
  an output buffer for each participant, the output buffer operable to receive and buffer the conference output stream for transmission to that participant.

47. The conference bridge of claim 46, where the conference stream output generator is operable to:
  apply audio parameters values by multiplying a multiple by values associated with packets within the audio stream.

48. The conference bridge of claim 46, further comprising a converter operable to convert packets within each audio stream received from a participant from a native format to a common format.

49. The conference bridge of claim 46, wherein the converter is operable to convert packets within each conference output stream for a participant from a common format to a native format.

50. The conference bridge of claim 46, further comprising a controller operable to dynamically change the audio parameters in the conference output stream generator based on participant input.

51. The conference bridge of claim 46, wherein each audio stream comprises a plurality of packets communicated according to Internet Protocol (IP).

52. A computer program stored on a tangible computer readable medium, the computer program operable to:
  receive an audio stream from each of a plurality of participants to a multiparty communication connection, wherein the audio stream comprises a plurality of packets;
  normalize a timing of the packets from each of the plurality of participants;
  cross-connect the audio stream of each participant to a conference output stream generator for each of the remaining participants;
  apply an audio parameter, at the conference stream output generator of each participant, to packets of each audio stream received for that participant, wherein the audio parameter is set by the participant for that particular audio stream; and
  combine, after application of the audio parameters at the conference stream output generator, a set of resulting audio streams to generate a conference output stream for that participant.

53. The computer program of claim 52, wherein the audio parameters comprise a multiple and wherein the computer program is further operable to apply the audio parameter to the audio streams by multiplying the multiple by the values associated with packets within the audio stream.

54. The computer program of claim 52, wherein the computer program is further operable to convert packets within each audio stream received from a participant from a native format to a common format.

55. The computer program of claim 52, wherein the computer program is further operable to convert packets within each conference output stream for a participant from a common format to a native format.

56. The computer program of claim 52, wherein the computer program is further operable to dynamically change the audio parameters based on participant input.

57. The computer program of claim 52, wherein the audio stream comprises a plurality of packets communicated according to Internet Protocol (IP).

58. A system for independent participant control of audio during a multiparty communication session, comprising:
  means for receiving an audio stream from each of a plurality of participants to a multiparty communication connection, wherein each audio stream comprises a plurality of packets;
  means for receiving an audio control signal from a first participant for an audio stream of a second participant;

means for normalizing a timing of the packets from each of the plurality of participants; and means for generating a conference output stream for the first participant by applying an audio parameter based on the audio control signal to packets within the audio stream.

59. A system for participant control of audio properties for a communication connection, comprising:

means for receiving an audio stream from each of a plurality of participants to a multiparty communication connection, wherein the audio stream comprises a plurality of packets;

means for normalizing a timing of the packets from each of the plurality of participants;

means for cross-connecting the audio stream of each participant to a conference output stream generator for each of the remaining participants;

means for applying, at the conference stream output generator, an audio parameter to each of a plurality of audio streams of a participant separately to packets within each of a plurality of audio streams of a participant independently set by the participant for that particular audio stream; and means for combining, after application of the audio parameters at the conference stream output generator, a set of resulting audio streams to generate a conference output stream for that participant.

* * * * *